March 11, 1924.

H. L. F. TREBERT 1,486,502

ROTARY GAS ENGINE

Filed Aug. 27, 1917  10 Sheets-Sheet 1

WITNESSES:
George D Powell

INVENTOR
Henry L. F. Trebert

BY
his ATTORNEYS

March 11, 1924.

H. L. F. TREBERT 1,486,502

ROTARY GAS ENGINE

Filed Aug. 27, 1917    10 Sheets-Sheet 3

WITNESSES:
George D Powell

INVENTOR
Henry L. F. Trebert
BY
his ATTORNEYS

March 11, 1924.

H. L. F. TREBERT 1,486,502

ROTARY GAS ENGINE

Filed Aug. 27, 1917    10 Sheets-Sheet 6

WITNESSES:

INVENTOR
Henry L. F. Trebert
BY
his ATTORNEYS

March 11, 1924.

H. L. F. TREBERT

1,486,502

ROTARY GAS ENGINE

Filed Aug. 27, 1917   10 Sheets-Sheet 10

WITNESSES:

INVENTOR.
Henry L. F. Trebert
BY
his ATTORNEYS.

Patented Mar. 11, 1924.

1,486,502

UNITED STATES PATENT OFFICE.

HENRY L. F. TREBERT, OF ROCHESTER, NEW YORK, ASSIGNOR TO TREBERT AIRPLANE MOTOR COMPANY INC., OF ROCHESTER, NEW YORK, A CORPORATION OF NEW YORK.

ROTARY GAS ENGINE.

Application filed August 27, 1917. Serial No. 188,342.

*To all whom it may concern:*

Be it known that I, HENRY L. F. TREBERT, a citizen of the United States, and a resident of Rochester, in the county of Monroe and State of New York, have invented certain new and useful Improvements in Rotary Gas Engines; and I do hereby declare the following to be a full, clear, and exact description of the same, reference being had to the accompanying drawings, forming a part of this specification, and to the reference numerals marked thereon.

My present invention relates to internal combustion engines and more particularly to gas engines of the rotary type and it has for its object to provide a simple, compact and powerful engine so constructed and arranged as to eliminate as such the usual weaknesses of rotary engines, namely, fuel supply, valve gear and lubrication. The improvements are directed in part to all of the last named features and also to the ignition system as well as to more general features of engine construction that simplify the construction of the crank shaft or fixed element, eliminate wear and weakness in the pistons and permit a greater number of cylinders to be used in proportion to the weight and general dimensions of the engine. To these and other ends the invention resides in certain improvements and combinations of parts all as will hereinafter be more fully described, the novel features being pointed out in the claims at the end of the specification.

In the drawings.

Similar reference numerals throughout the several views indicate the same parts.

The engine illustrated as an embodiment of my invention has been designed particularly for aeroplane use and I will first briefly recite some of its main characteristics. It is a sixteen cylinder engine, air cooled. The fixed element is a crank shaft having only two cranks or crank centers and the pistons are constructed in pairs the units of which are relatively fixed and operate together although no two cylinders are timed exactly the same. The fuel supply reaches the cylinders, ultimately, in the manner of the ordinary stationary engine, there being, in the present instance, a manifold for each four cylinders. There is an individual exhaust for each cylinder through which an air current is forced by the rotation of the engine to cool the exhaust valve. Puppet-valves are used and they are actuated by cam shafts and rocker arms with one cam shaft to each four cylinders but the valve gear is so constructed that the valves escape the effect of centrifugal force, hitherto a source of trouble in rotary engines. The lubricating system involves the use of the crank shaft as an oil conduit with the flow of oil suitably regulated therethrough and centrifugal action depended upon for distribution to all but the main and piston bearings. In the ignition system, a fixed source of energy is distributed to the cylinders through the medium of the cam shafts, of which latter, as before stated, there is one for each four cylinders with individual auxiliary distributors for each cylinder on each cam shaft. Despite the fact that the cylinders of each pair move together, there are eight impulses or explosions to each revolution of the engine.

Figure 1:
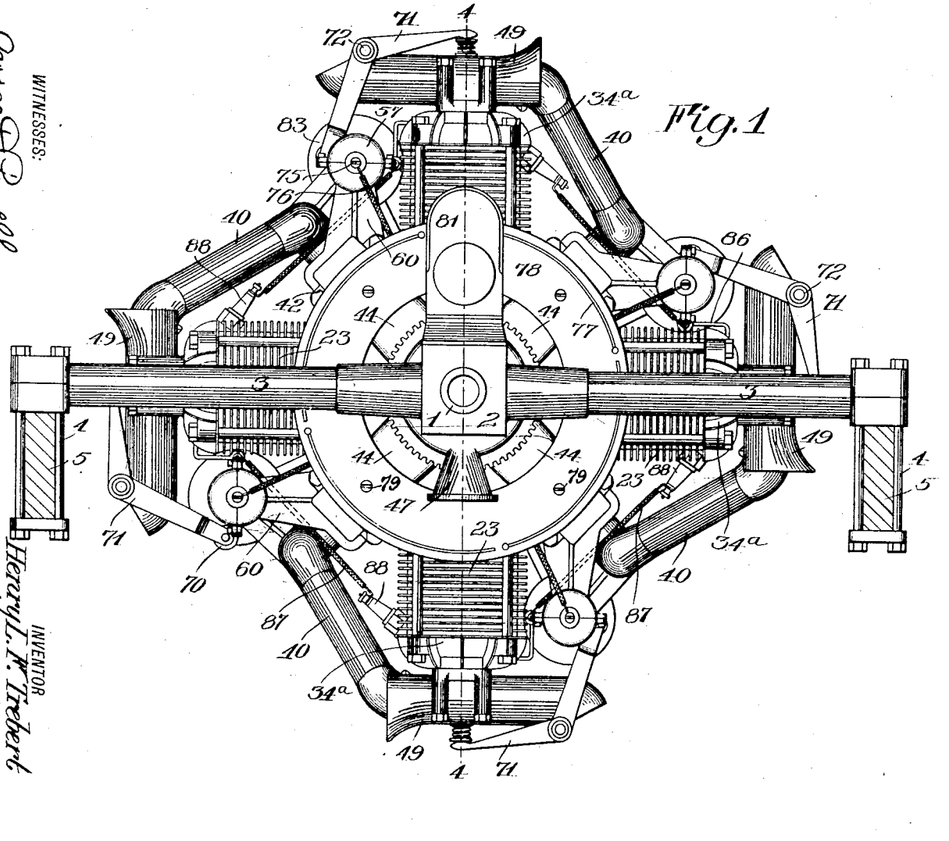
Figure 1 is an end view of a rotary gas engine constructed in accordance with and illustrating one embodiment of my invention.
Figure 2:
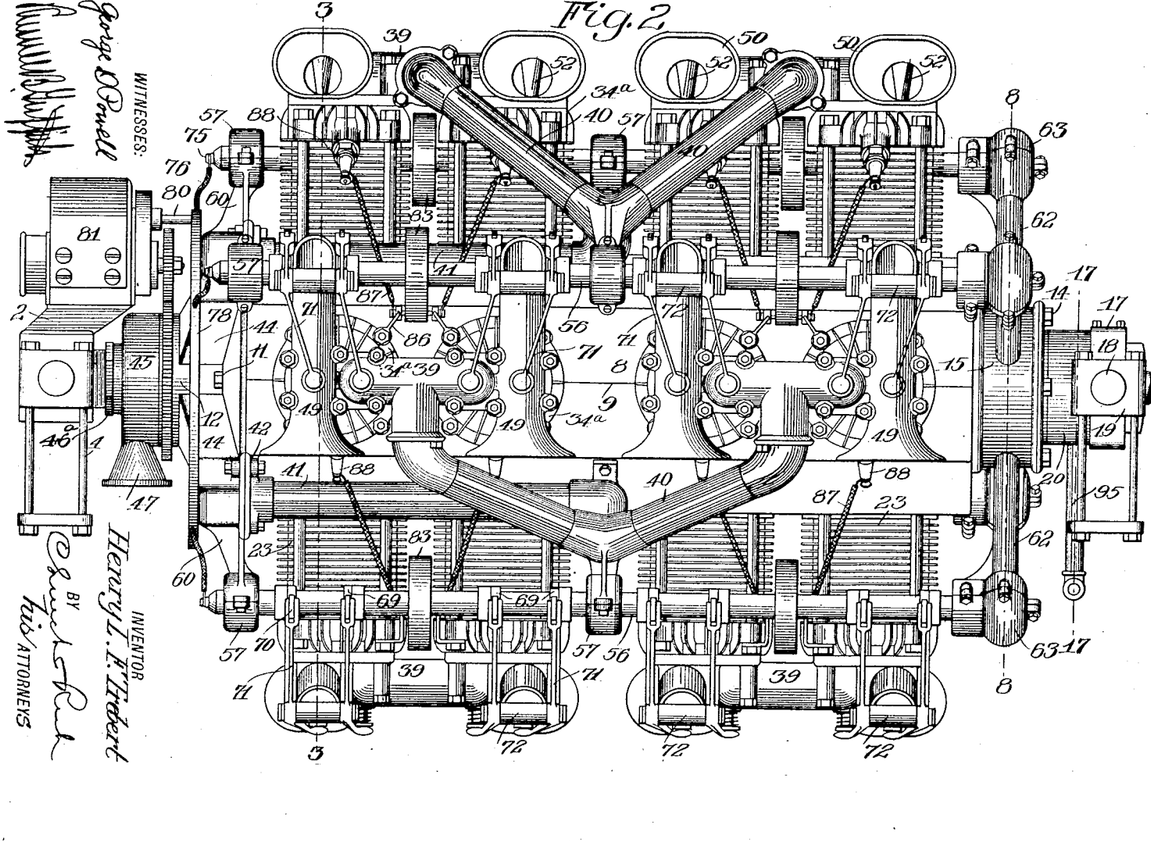
Figure 2 is a side view thereof.
Figure 4:
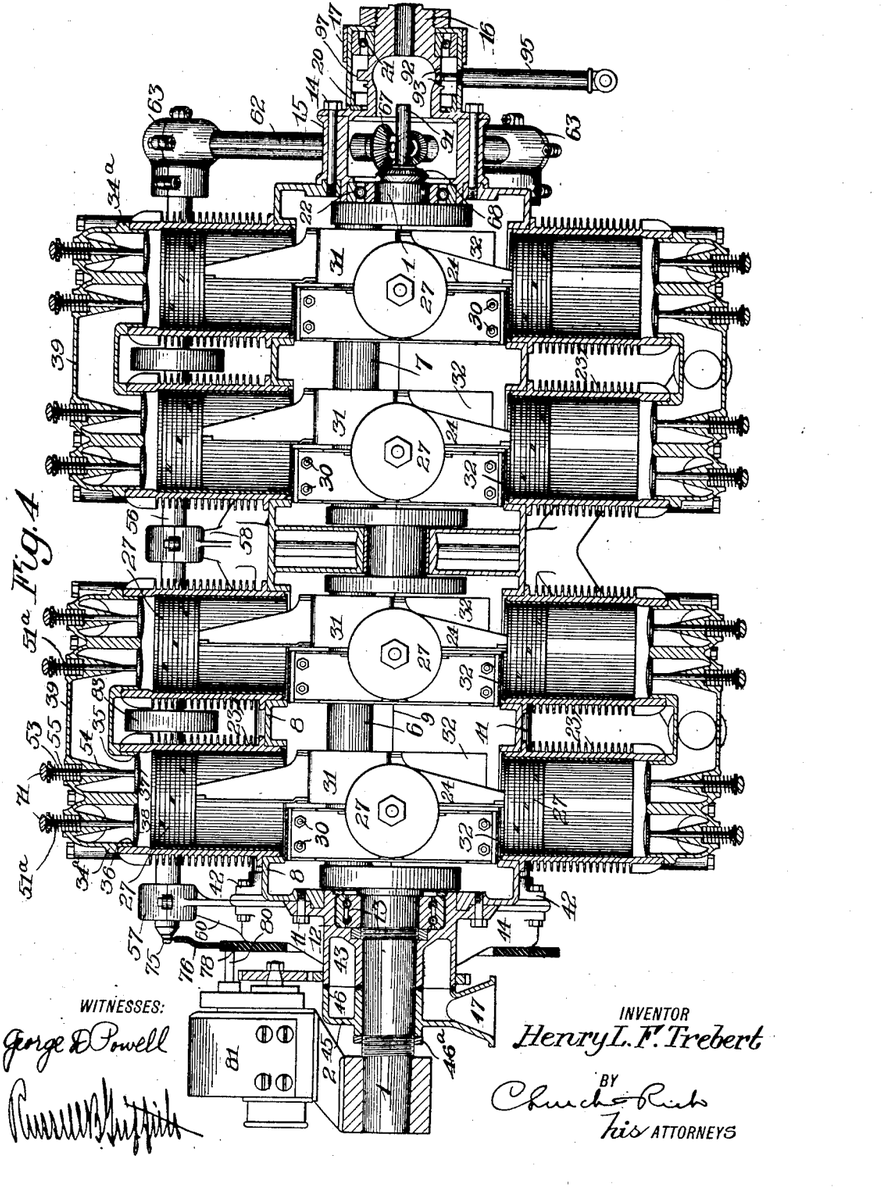
Figure 4 is a longitudinal section taken substantially on the line 4—4 of Figure 1.
Figures 14, 15, 16:
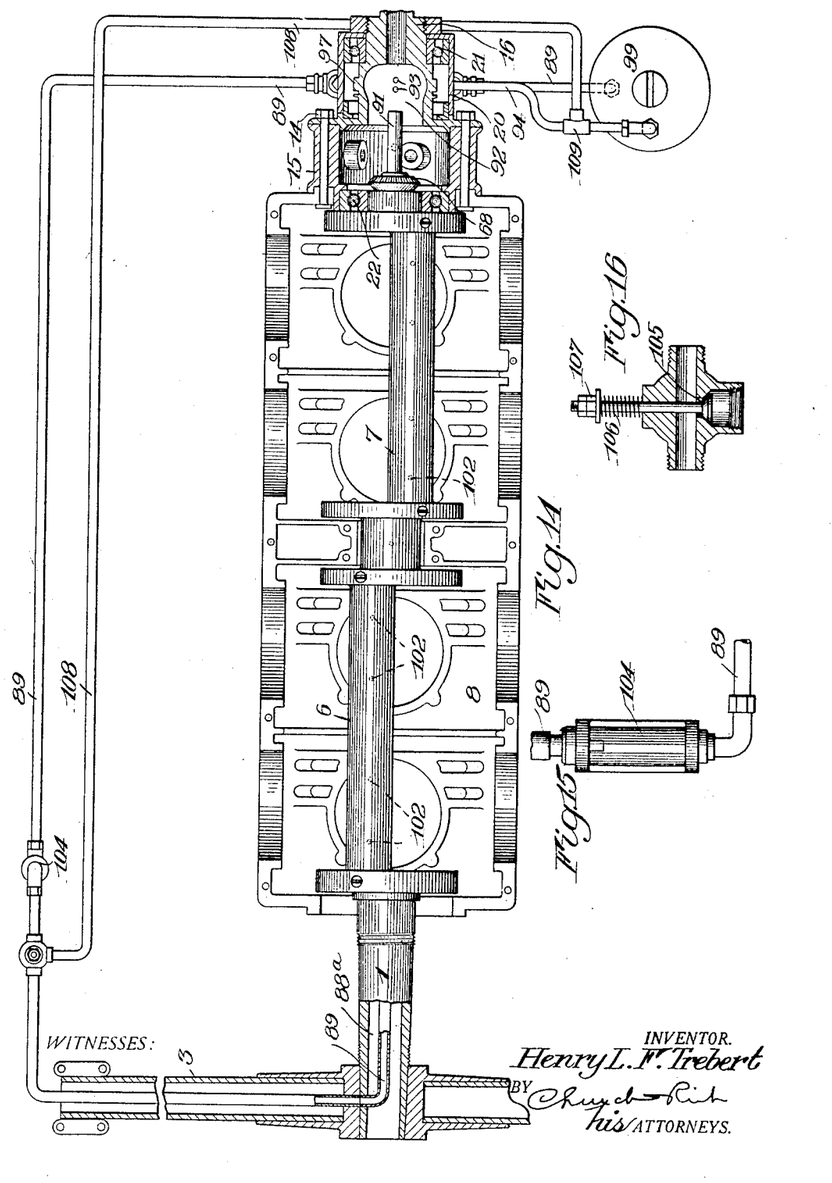
Figure 14 is a longitudinal horizontal section through the axis of the engine in the plane of the crank case joint with parts removed to illustrate generally the system of lubrication.
Figure 15 is a detail elevation of the sight feed gage.
Figure 16 is a detail section through the pressure valve or force feed gage.

Referring more particularly to the drawings and to Figures 1, 2 and 4 thereof, 1 indicates a crank shaft that constitutes a central fixed element of the engine. At the left hand end it is fixed in a block 2 supported by a bar 3, saddled at 4 upon suitable beams or supports 5. It has two cranks 6 and 7 only slightly offset from each other, as shown in Figure 14. The crank is enclosed within a crank case 8 that is rectangular and made in halves, as usual, with a seam at 9 in the plane of the axis of the engine. Bolted to the crank case in longitudinal rows of four each and projecting radially at 90° angle from each other are the cylinders 23. The case is bolted at 11 at its left hand end to a hub casting 12 having a bearing on the shaft 1 at 13 and which hub casting also forms part of the fuel intake system as will be later explained. At the opposite end the case is similarly bolted at 14 to an inner hub casting 15 and an outer hub casting 16. This latter is mounted in a box 17 by means of which it is mounted on a transverse bar 18 saddled at 19 on the beams 5 and in this manner the engine is supported at the right hand end. Between the outer hub 16 and a casing 20 in box 17 is a ball bearing 21 on which the hub turns and a ball bearing 22 within the inner hub 15 receives the right hand end of the crank shaft 1.

Figure 3:
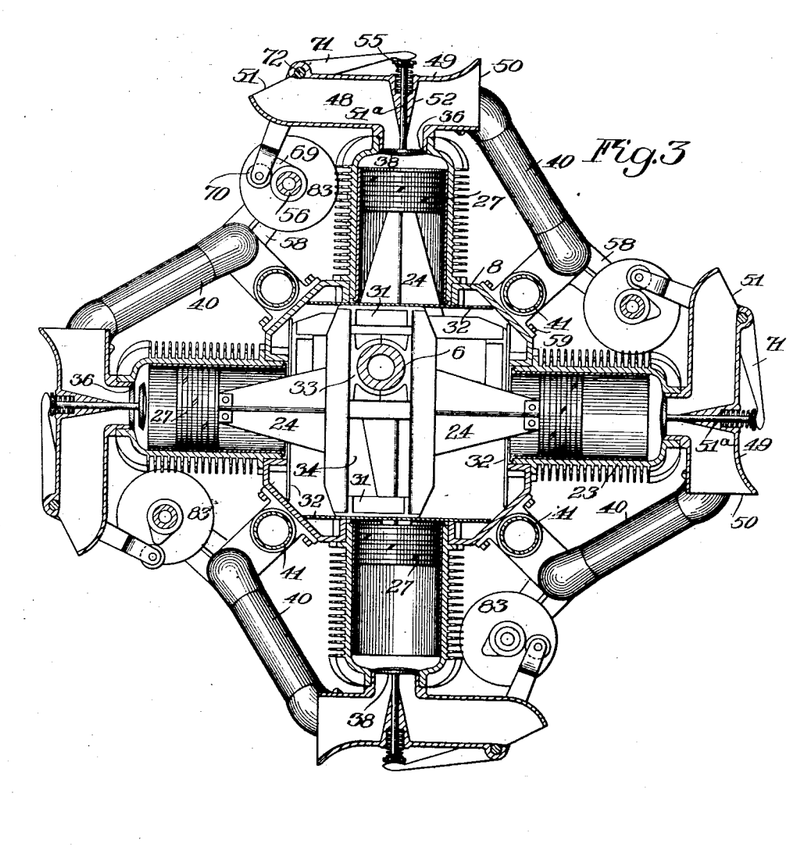
Figure 3 is a transverse section taken substantially on the line 3—3 of Figure 2.
Figure 5:
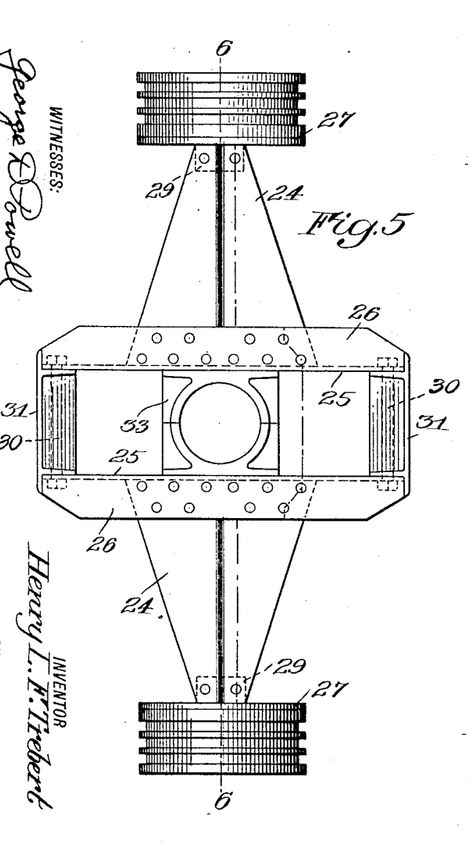
Figure 5 is an enlarged elevation of one of the piston couples.

Bolted or otherwise suitably secured on the outside of the case 8 are a plurality of radially disposed cylinders 23 ribbed for air cooling. They are arranged in longitudinal and circumferential rows of four each and in the circumferential rows, as shown in Figure 3, the axes of the cylinders all lie in the same transverse plane. The cylinders are therefore opposed in pairs and the pistons 27 of each pair are relatively immovable and rigidly connected together by connecting rods 24, as shown in detail in Figures 5, 6 and 7 in conjunction with an intermediate cross head 25. The connecting rods are each composed of two angle irons disposed against each other and riveted to flanges 26 on the cross head 25, as shown, and the angle irons are so associated that the connecting rods and the cross heads present a plane surface on one side in which lies the axis of the cylinders. The pistons, on the one hand, and their connecting rods on the other, are therefore relatively offset so that the connections between each two pairs of pistons of the four cylinders whose axes lie in the same transverse plane, can cross each other without interference and be connected to the same crank center 6 as hereinafter described and as shown in Figure 4. A stud 28 extending centrally through the pistons has an offset lug 29 (Figure 6) by means of which it is riveted or otherwise secured to the connecting rod.

Each cross head 25 is preferably constructed of two channel irons embodying the flanges 26 that are connected by bolts 30 and spaced at either end by bronze shoes 31 that are clamped between them. These shoes are adapted to travel upon hardened steel way plates 32 (Figure 3) suitably fixed upon the interior of the case 8 at the bases of the cylinders 23 and which partly cover the lower ends of the cylinders. The crank shaft 1 passes through the cross heads 25 and is received by each in a sliding journal block 33 that travels in the slot 34 in the cross head. Thus, the rotation of the outer element, including the cylinders 23 and crank case 8, about the fixed crank shaft is accompanied by reciprocations of each cross head 25 on its ways 32 and of each journal box 33 transversely thereto within the cross head. Conversely, the reciprocations of the pistons 27 of each pair reciprocate the cross heads 25 and react against the cranks 6 and 7 of the crank shaft by means of the sliding journal boxes 33 to impart rotary movement to the crank case and cylinders. Rotating with the crank case are the hubs 15 and 16 and the drive is taken from the latter to which may be directly attached, in the present instance, the aeroplane propeller.

As before noted, only two crank centers are required with four pairs of pistons or eight individual pistons on each crank. It is not believed to be necessary to explain in detail the sequence of the cylinder explosions beyond saying that it is a four cycle engine and that there are eight explosions per revolution so that there is a practically constant impulse. Obviously, no two opposed cylinders can fire at the same time as their pistons are rigidly connected and the arrangement is such that one cylinder of such a pair is compressing or exhausting while the other is firing.

In the present instance, the cylinder heads 34ª are cast in pairs for adjacent elements of the longitudinal rows of cylinders and have formed therein the intake ports 35 and the exhaust ports 36, respectively controlled by intake valves 37 and exhaust valves 38. Communicating with the intake ports 35 by means of a head 39 on each pair of cylinders are the branches of a manifold 40. There is one such manifold between each two longitudinal rows of cylinders, or four in all and each manifold is supplied by a longitudinally extending pipe 41 connected at 42 to the hub casting 12. Within this casting is a fuel chamber 43 (Figure 4) from which lead four fuel passages 44 delivering to the supply pipes 41. Part of the fuel chamber 43 is formed in the rotating hub casting 12 and part in a casting 45 locked against rotation on the crank shaft 1 and between these relatively movable castings is provided a suitable air-tight joint 46 tightened by a nut 46ª threaded on the shaft and bearing against the casting 45. The casting 45 has a mouth 47 forming a means of attachment to a stationary carbureter or source of fuel supply.

The exhaust ports 36 deliver into a chamber 48 (Figure 3) that is formed in the present instance by a transverse pipe 49 cast integrally with the cylinder head and open at both ends. Its longitudinal extent is such that as the engine rotates a strong air current will be forced into the preferably expanded end 50 and out at the end 51, together with the products of combustion from the exhaust port. This tends to keep the cylinder head cool and effectively prevents the exhaust valve 38 from over-heating. To this end, the stem 51ª of the valve reciprocates in a bearing 52 disposed transversely across the chamber 48 where it receives the full effect of the blast of air.

Both of the valves 37 and 38 open inwardly toward the center of rotation on radial lines and close in an outward direction, the stem 53 of each intake valve being also guided in a bearing 54 in the cylinder head but being cooled by the current of fuel. Springs 55 tends to close the valves, as usual, but they are opened in a positive manner for the reason that with the arrangement described, centrifugal force is always acting to close the valves and hence should preferably work with the springs instead of against them. This effect of centrifugal action on the valves has always presented difficulties in rotary engines and I have found it very difficult if not impossible to operate a valve with a spring against centrifugal force in a uniform manner, it being borne in mind that the pressure due to centrifugal action varies with the speed of the engine.

Figure 8:
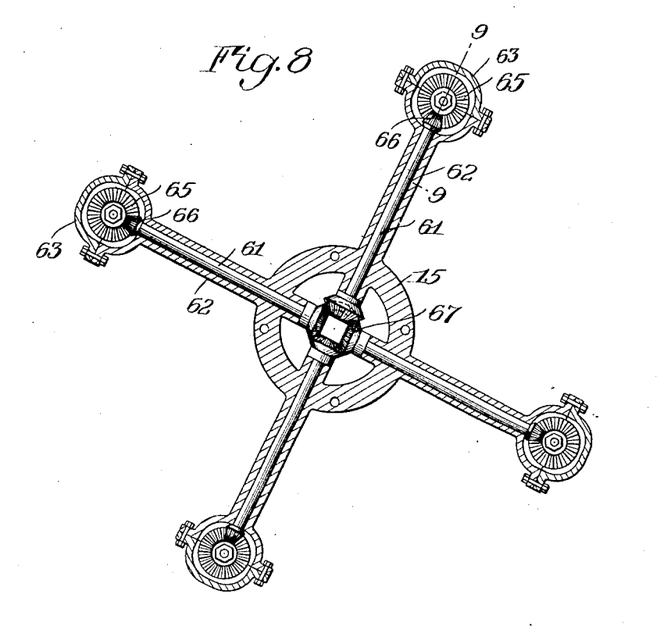
Figure 8 is a section through the drive shaft casings of the cam shafts taken substantially on the line 8—8 of Figure 2.
Figure 9:
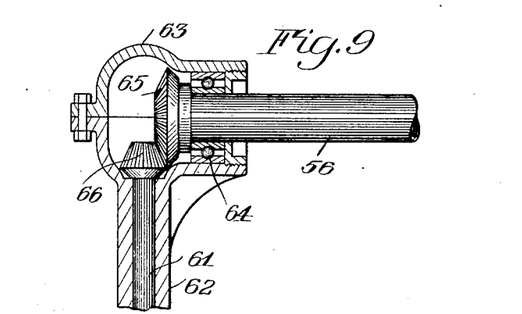
Figure 9 is an enlarged detail section taken substantially on the line 9—9 of Figure 8.

To positively open the valves in an inward direction, I employ a cam shaft 56 for each longitudinal row of cylinders, there being one such cam shaft between each two rows. These shafts are supported in bearings 57 on arms 58 extended from the fuel supply pipes that are secured to the crank case 8 as at 59 (Figure 3) and also by arms 60 on the hub casting 12 at the left hand end of the engine. At their opposite ends the cam shafts receive their driving connections which comprise radial shafts 61 in casings 62 extended from the inner hub casting 15 (Figure 8). The casings 62 terminate in gear cases 63 in which the cam shafts 56 have a bearing at 64 (Figure 9) and which contain intermeshing bevel gears 65 and 66 on the cam shafts and drive shafts, respectively. At their inner ends, the shafts 61 are provided with intermeshing bevel gears 67, one of which is larger than the rest, as shown, to mesh with a bevel gear 68 on the end of the crank shaft 1.

Cams 69 on the cam shafts cooperate with rollers 70 on bell crank rocker arms 71 suitably journaled on the cylinder head castings 34. In the present instance, they turn in bosses 72 on the exhaust tubes 49 and the arms of the levers rest upon the valve stems 51 and 53 in the usual manner.

Figures 10, 11, 12, 13:
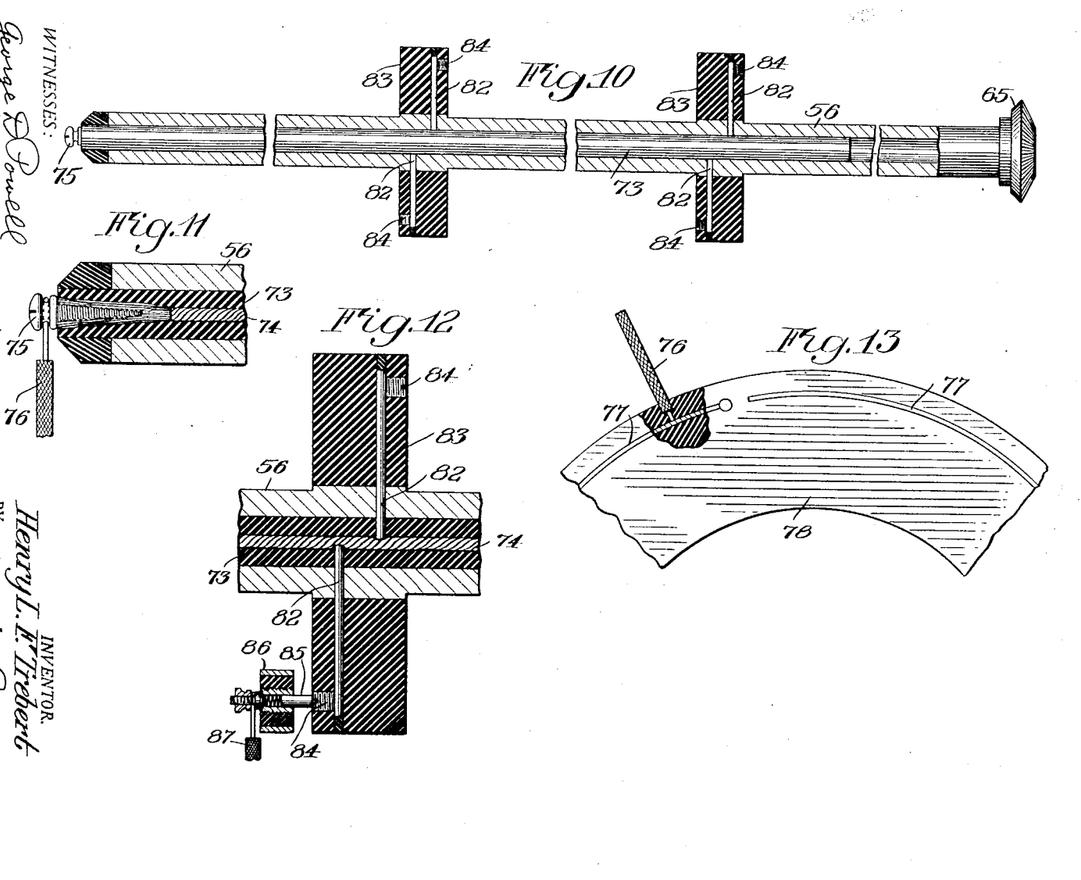
Figure 10 is an enlarged central section through one of the cam shafts and through the auxiliary distributors carried thereby.
Figure 11 is an enlarged detail section through one end of a cam shaft and its electrical connection.
Figure 12 is an enlarged section through one of the auxiliary distributors.
Figure 13 is an enlarged fragmentary view of the main distributor, partly in section.

The cam shafts are also utilized to transmit and distribute the current in the ignition system of the engine. To this end, each is provided (Figures 10, 11 and 12) with an insulating core 73 containing a wire or conductor 74 terminating in an insulated binding post 75. To each binding post 75 is attached a wire 76 leading to one of four contacts 77 on a main distributor disc 78 composed of insulating material and secured at 79 (Figure 1) to the hub casting 12. This distributor 78 rotates against the brush 80 of a magneto 81 or other fixed source of electrical energy. The magneto is, in the present instance, mounted upon the block 2 and the brush successively makes contact with the contact inlays 77 for each cam shaft. From the wire 74 of the shaft, the current is led through conductors 82 in auxiliary distributing discs 83 of insulating material and of which there are two on each shaft with contacts 84 on opposite sides, one for each of two adjacent cylinders of a longitudinal row of cylinders. Arranged to cooperate with the contacts 84 are brushes 85 (Figure 12) supported on brackets 86 (Figure 2) on the cylinder head. From these brushes 85 wires 87 lead to the respective spark plugs 88 in the cylinder heads and with these main and auxiliary distributors the desired timing of the cylinders can be established as will be apparent to one skilled in the art.

Figure 17:
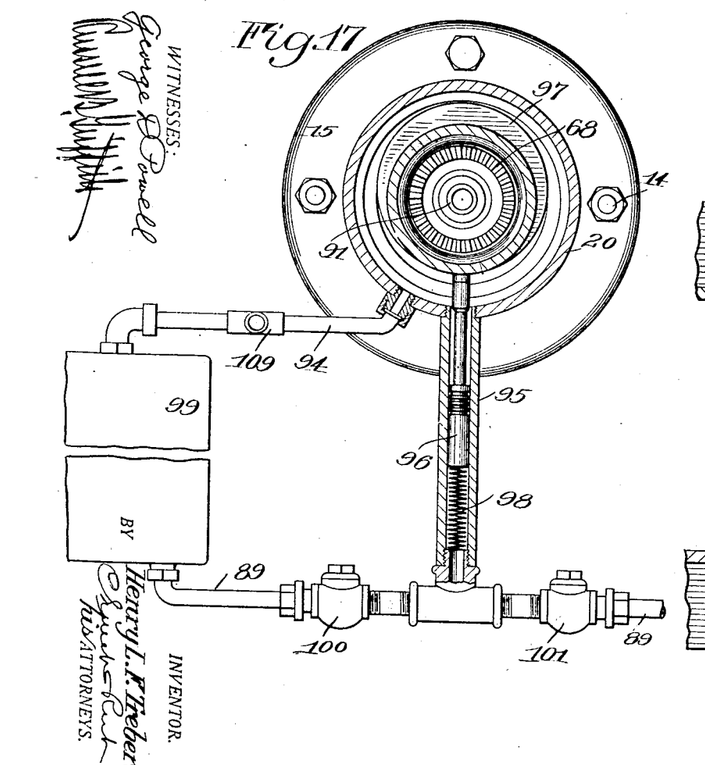
Figure 17 is an enlarged section taken substantially on the line 17—17 of Figure 2 and also illustrative of the oiling system.
Figure 19:
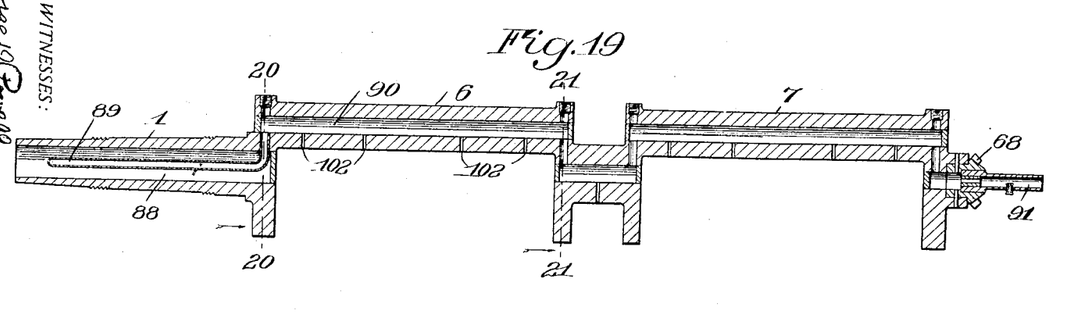
Figure 19 is a longitudinal section through the crank shaft.
Figure 20:
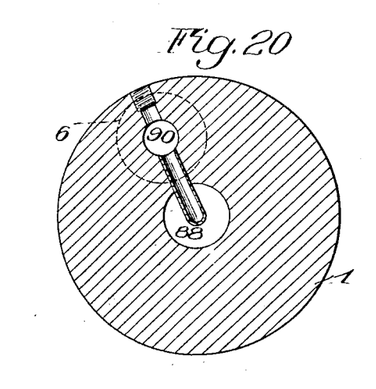
Figure 20 is an enlarged section taken substantially on the line 20—20 of Figure 19.
Figure 21:
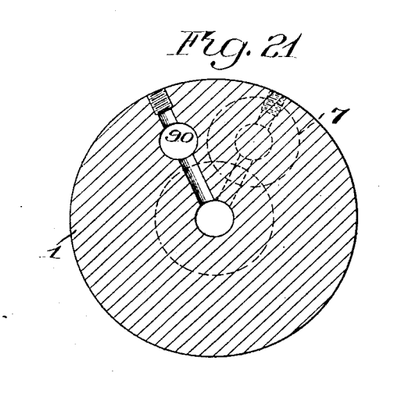
Figure 21 is an enlarged section taken substantially on the line 21—21 of Figure 19.

The lubricating system employed utilizes the crank shaft 1 as a conduit for conveying oil to the interior of the crank case from which point it is distributed to the cylinder walls and valves by centrifugal action. Referring more particularly to Figures 14 and 19, the left hand end of the crank shaft is hollow as indicated at 88ᵃ and encloses a supply pipe 89 that may be introduced through the supporting bar 3, as shown. This supply pipe delivers to a passage 90 running the length of the shaft, including the cranks 6 and 7 and the gears 68 and terminates in a nozzle 91 that delivers into a collecting chamber 92 within the outer hub 16 of the crank case. From the chamber 92 the oil is adapted to drain through apertures 93 into a casing 20 to which is connected a drain pipe 94. Also connected to the casing 20 is a pump cylinder 95 (Figure 17) containing a piston 96 driven by a cam 97 on the hub 16 and returned by a spring 98. The pump communicates with supply pipe 89 leading from the bottom of a supply tank 99 and delivering to the crank shaft at 88 as previously described. The pipe 89 is provided at opposite sides of the pump with check valves 100 and 101. These are not shown in detail as it will be understood that 100 closes and 101 opens on the down stroke, while 100 opens and 101 closes on the up stroke. Any suitable form of pump may be used.

Figure 18:
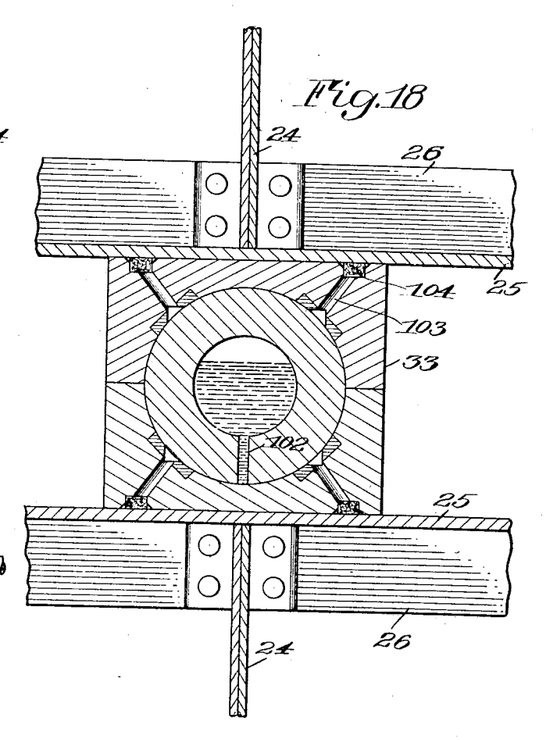
Figure 18 is an enlarged fragmentary section through the crank shaft and one of the piston bearings.

The cranks 6 and 7 and also the main bearing portions of the crank shaft are provided with feed openings 102 and as the oil is forced from the supply tank 99 through the pipe 89 to the left hand end of the crank shaft and thence out at the nozzle 91 at the right hand end, through chamber 92 and casing 20 back to the supply tank through drain pipe 94, enough oil passes through the oil holes 102 to lubricate all the working parts. In Figure 18 is illustrated the manner in which the cross head slides 25 are lubricated from the crank bearing by means of oil passages 103 having absorbent wipers 104 in the sliding journal box 33.

To regulate the feed of the oil and hence its pressure within the crank shaft, the supply pipe 89 is fitted at a convenient point with a sight feed gage 104 shown in Figures 14 and 15 and there is also arranged in the supply pipe a pressure valve 105 seated by a spring 106 the tension of which latter is controlled by nuts 107. The said pressure valve leads into a by-pass pipe 108 that carries back to the supply tank or reservoir 99 by connection with the drain pipe 94 at 109. If the pumping pressure rises above that for which the pressure valve 105 is set, the latter opens and directs the excess oil back to the tank, relieving the feed to the crank shaft.

Figure 6:
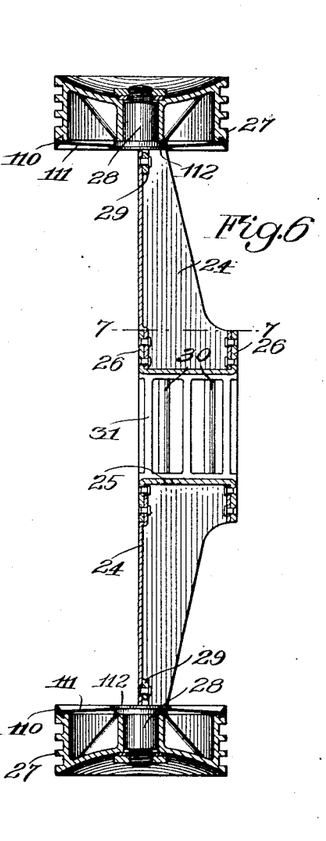
Figure 6 is a section on the line 6—6 of Figure 5.
Figure 7:
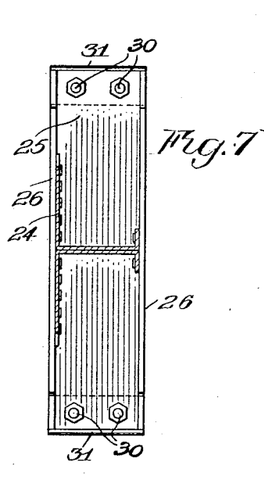
Figure 7 is a section on the line 7—7 of Figure 6.

To prevent an excess of oil being forced into the cylinders 23, I prefer to construct the pistons 27 as shown in Figure 6. At the lower end of the piston skirt I provide a preferably absorbent and yielding scraper ring 110 within which is an elastic annular diaphragm 111. This diaphragm is sprung and is clamped between a collar 112 on the connecting rod bolt 28 and the piston skirt with the desired expansive force to spread the ring 110 against the cylinder walls and prevent the entrance of more than a thin film of oil between the piston and cylinder. The diaphragm 112 also acts to deflect the oil laterally toward the cylinder walls for this purpose and prevents it from accumulating in the dead corners within the piston head.

One advantage of the connection of the pistons in rigid pairs as described is to be noted and that is the balance that is given the reciprocatory parts against the influence of strains set up by centrifugal action. The centrifugal pull of one piston is neutralized by the pull of the other (subject to their slight variations from the axis of rotation) instead of being taken by the crank shaft.

I claim as my invention:

1. In a rotary engine the combination with a fixed crank shaft of a set of cylinders comprising two opposed pairs, a rigid connection between the pistons of a pair providing for operative connection thereof with the crank shaft, comprising a plane web and a reinforcing rib on one side thereof, the webs of the pairs lying substantially in contact.

2. In a rotary engine the combination with a fixed crank shaft of a set of cylinders comprising two opposed pairs, a rigid connection between the pistons of a pair providing for operative connection thereof with the crank shaft, comprising a pair of angles having flanges secured together, the other flanges providing a substantially plane web, the webs of the pairs lying substantially in contact.

3. A rotary internal combustion engine operating on the Otto cycle comprising a fixed shaft having a pair of cranks and a rotary crank case having two sets of four radiating, substantially co-planar cylinders for each crank.

4. A rotary internal combustion engine operating on the Otto cycle, comprising a fixed shaft having a plurality of cranks, and a rotary crank case having an equal number of plural sets, each set in multiples of four, substantially co-planar cylinders, and each set comprising pairs of opposed cylinders.

5. A rotary internal combustion engine operating on the Otto cycle, comprising a fixed shaft having a plurality of cranks, and a rotary crank case having an equal number of plural sets, each set in multiples of four substantially co-planar cylinders and each set comprising pairs of opposed cylinders, the cylinders of each pair having rigidly connecting pistons.

6. A rotary internal combustion engine operating on the Otto cycle comprising a fixed shaft having a pair of cranks offset substantially an eighth of a circumference and a rotary crank case having for each crank two sets each of four substantially co-planar radiating cylinders in opposed pairs.

7. An engine of the class described comprising a fixed shaft, a rotary element embodying a plurality of cylinders, a member on said shaft contacting with the rotary element and forming in combination therewith a fuel-receiving chamber, and a fuel conduit opening through said rotary member to the chamber and leading to a cylinder, said member being movable along the shaft for pressing the same against the rotary element to close said chamber and means for so adjusting the movable element.

8. In a rotary gas engine, the combination with a fixed central element and a rotary element embodying a cylinder having a port and a valve controlling the port, of a cam shaft extending parallel with the axis of the engine carried by the rotary element and having a driving connection with the fixed element, and a rocker arm actuated by the cam shaft to operate the valve.

9. In a rotary gas engine, the combination with a fixed central element and a rotary element embodying longitudinal rows of radial cylinders having ports, and valves controlling the ports, of cam shafts carried by the rotary element to extend longitudinally of and between the rows of cylinders, driving connections between the cam shafts and the fixed central element and means actuated by the cam shafts for operating the valves.

10. In a rotary gas engine, the combination with a fixed central element and a rotary element embodying a cylinder having valves and an ignition device, of a cam shaft on the rotary element operatively connected to actuate the valves, a distributor carried on the rotary element, circuit connections between the distributor and the cam shaft and between the latter and the ignition device, and a fixed source of electrical energy arranged in contact with the distributor.

11. In a rotary gas engine, the combination with a fixed central element and a rotary element embodying cylinders having valves and ignition devices, of a cam shaft on the rotary element operatively connected to actuate the valves, a main distributor carried on the rotary element, auxiliary distributors on the cam shaft, circuit connections through the cam shaft from the main distributor to the auxiliary distributors and from the latter to the ignition devices, and a fixed source of electrical energy arranged in contact with the main distributor.

12. In a rotary gas engine, the combination with a fixed central element and a rotary element embodying a cylinder having valves and an ignition device, of a cam shaft on the rotary element operatively connected to actuate the valves, a distributor on the cam shaft, a fixed source of electrical energy and circuit connections from the latter to the distributor and from the latter to the ignition device.

HENRY L. F. TREBERT.

Witness:
AGNES NESBITT BISSELL.